United States Patent [19]

Borgudd

[11] Patent Number: 4,793,193

[45] Date of Patent: Dec. 27, 1988

[54] DEVICE FOR SENSING LOADS

[76] Inventor: Slim T. Borgudd, Flat 10, Wootton Hall, Wootton Wawen, Sweden, B95 6EE

[21] Appl. No.: 937,096

[22] Filed: Dec. 2, 1986

Related U.S. Application Data

[63] Continuation-in-part of Ser. No. 784,885, Sep. 26, 1985, abandoned.

[30] Foreign Application Priority Data

Jan. 31, 1985 [WO] PCT Int'l Appl. .................. PCT/SE85/00045

[51] Int. Cl.4 .................... G01L 5/16; H01C 10/12
[52] U.S. Cl. ............................. 73/862.04; 73/862.68; 338/99
[58] Field of Search ........... 73/862.04, 862.05, 862.06, 73/862.57, 862.68; 338/47, 99, 114

[56] References Cited

U.S. PATENT DOCUMENTS

| | | | |
|---|---|---|---|
| 3,806,471 | 4/1974 | Mitchell | 338/99 X |
| 4,013,835 | 3/1977 | Eachus et al. | 340/862.05 X |
| 4,106,370 | 8/1978 | Kraus et al. | 73/862.68 X |
| 4,163,204 | 7/1979 | Sado et al. | 338/114 |
| 4,210,895 | 7/1980 | Sado et al. | 338/99 |
| 4,314,228 | 2/1982 | Eventoff | 338/114 |
| 4,315,238 | 2/1982 | Eventoff | 338/99 |
| 4,479,392 | 10/1984 | Froeb et al. | 73/862.05 X |
| 4,493,219 | 1/1985 | Sharp et al. | 73/862.05 X |

OTHER PUBLICATIONS

Amase—"New Pressure Conductive Rubber Changes . . . Concepts", JEE, No. 145, Jun. 1979, pp. 20-24.

*Primary Examiner*—Charles A. Ruehl

[57] ABSTRACT

A device for sensing loads comprises rigid first and second members having opposed surfaces and a sensor subjected to compressive loading between the opposed surfaces. The sensor comprises an electrically conductive thin layer of material in conductive engagement with spaced apart conductors so as to provide an electrical path between the conductors through the conductive layer. The surface of the conductive layer is of undulating form whereby the conductive engagement will vary with variation in loading on the sensor.

13 Claims, 9 Drawing Sheets

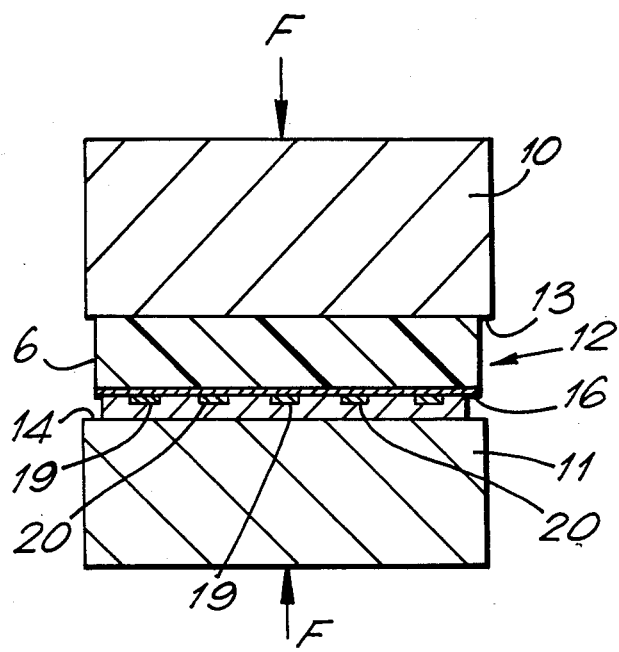
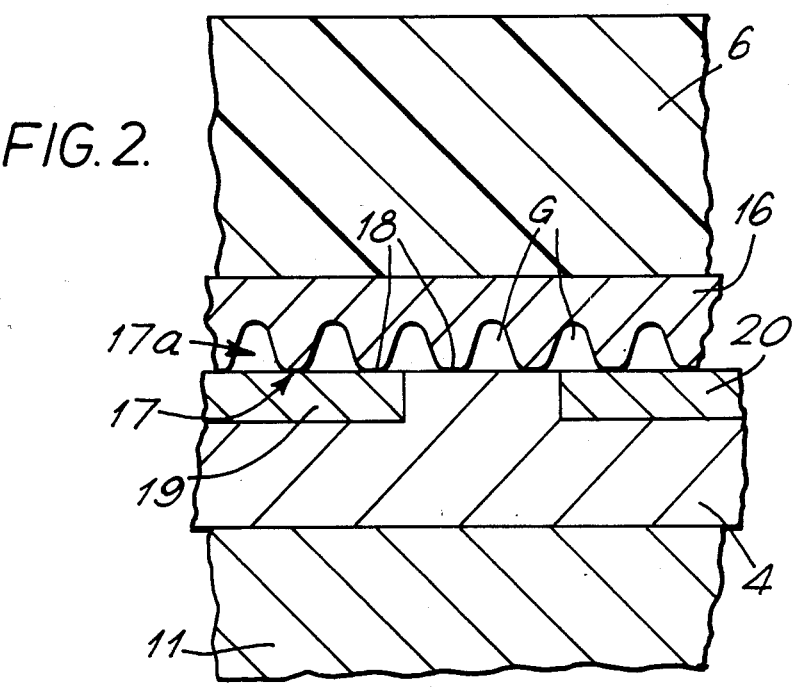

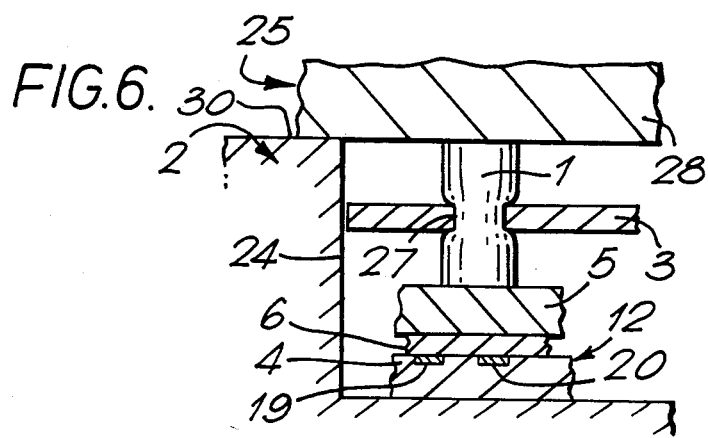
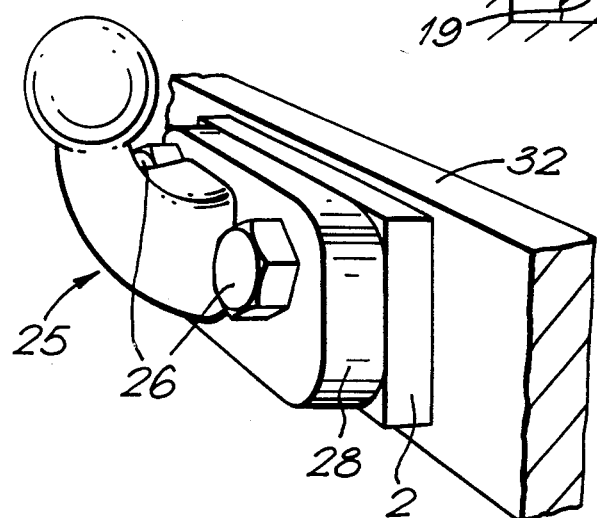
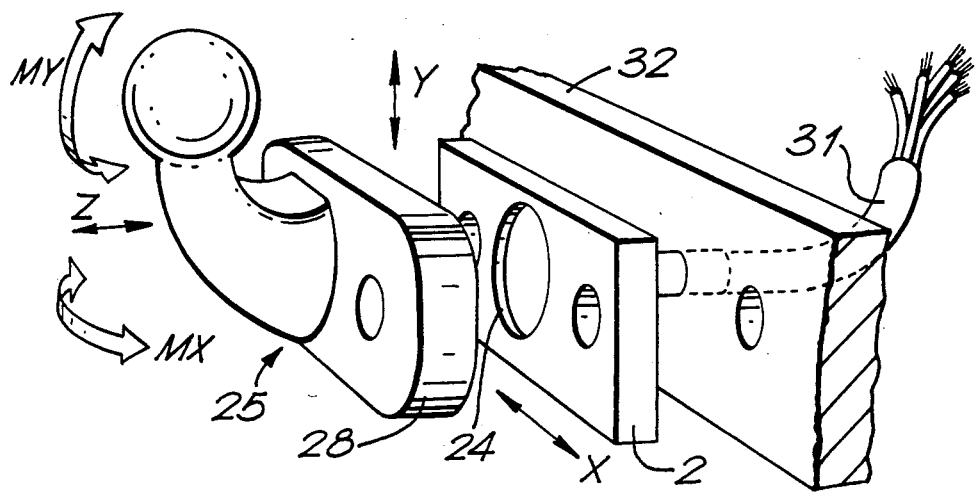

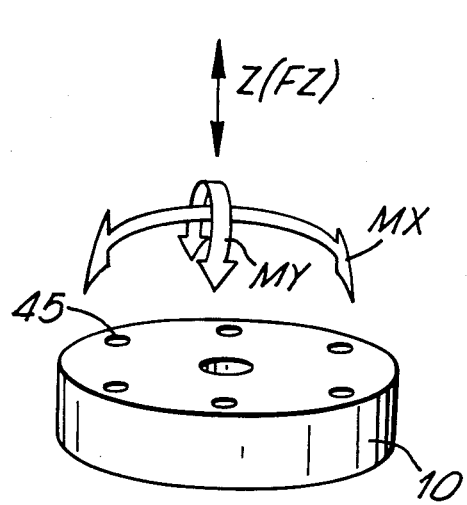
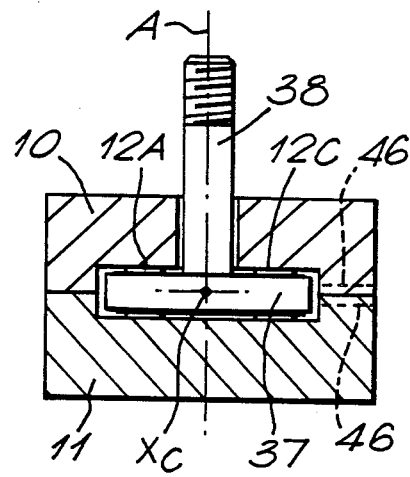
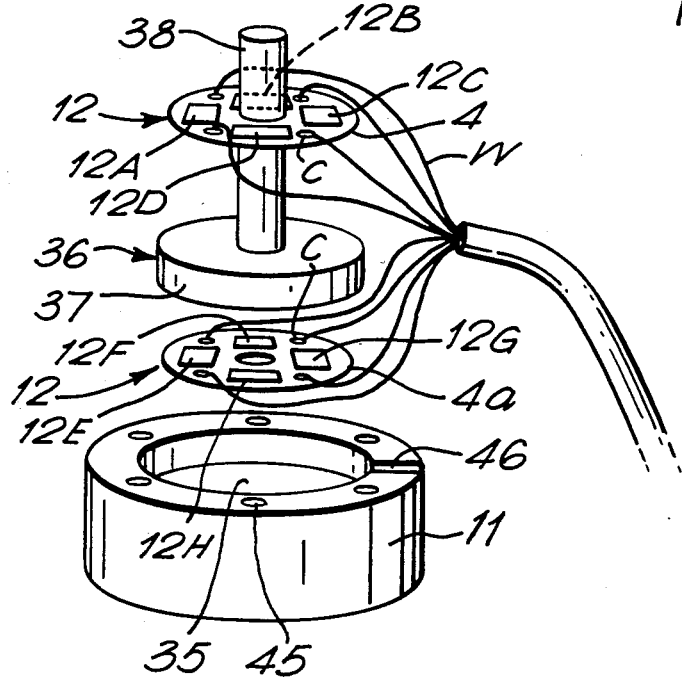
FIG. 9.
FIG. 10.

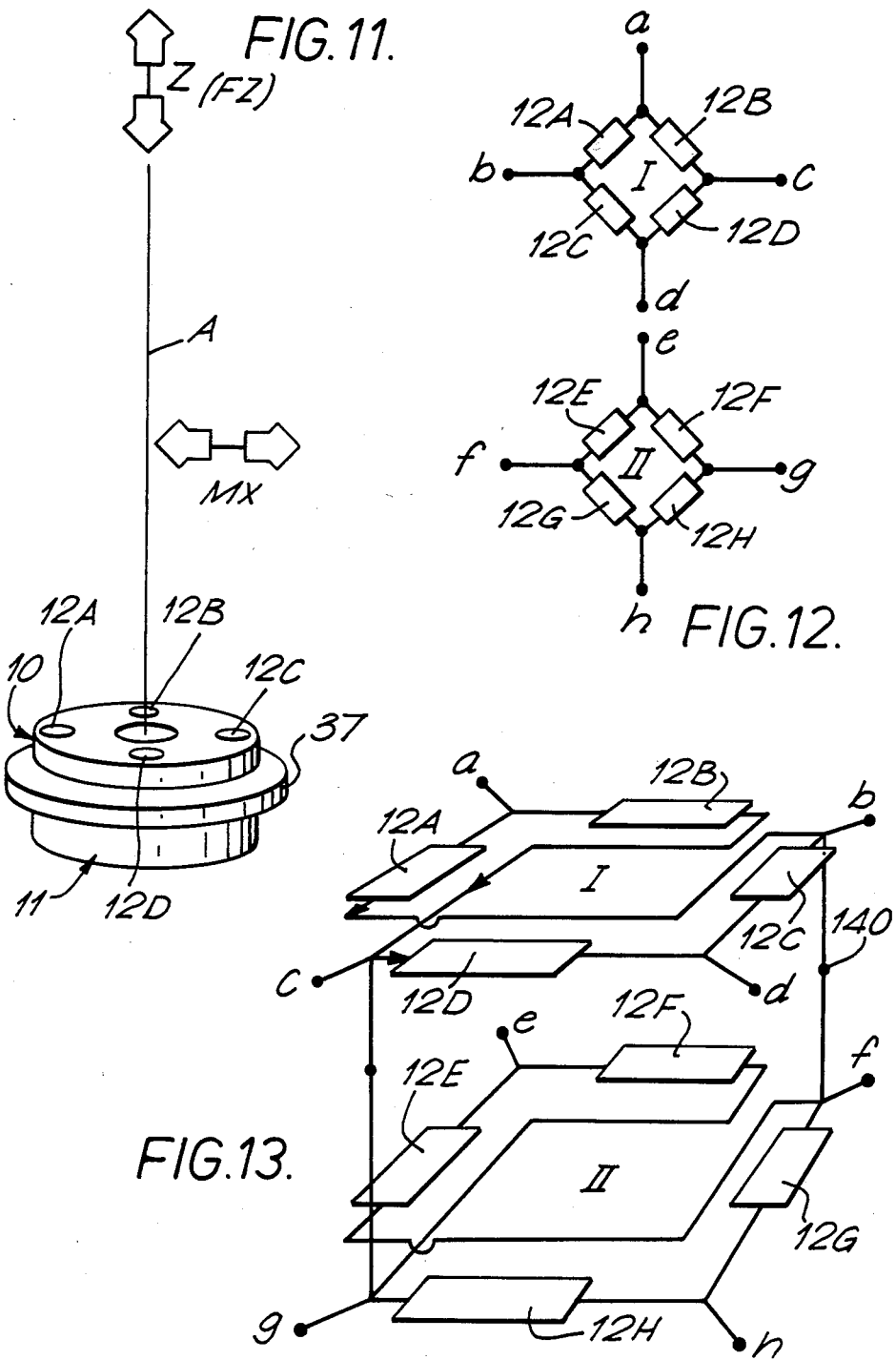

DEVICE FOR SENSING LOADS

This application is a continuation-in-part of application Ser. No. 784,885, filed September 26, 1985, abandoned.

The present invention relates to a device for sensing loads for example, loads in three axes X-Y-Z.

There already exist sensors of various kinds, e.g. as described in U.S. Pat. Nos. 4,013,835, 4,479,392 and 4,493,219. In U.S. Pat. No. 4,013,835 the sensor is operated by use of a flexible upper layer which can be depressed locally by light pressure, e.g. as applied by the human finger, a layer of material being provided beneath the flexible upper layer which is a reasonably good conductor of electricity when subjected to local pressure. Such an arrangement is designed specifically for very light load applications. The sensors described in U.S. Pat. No. 4,479,392 similarly rely upon a flexible member which will bend when subject to load so as to move two normally spaced resistive area progressively into contact with each other as load on the flexible member by an oblique actuator 28 increases. This system is aimed at operation by means of a joystick and is again for light-load application. U.S. Pat. No. 4,493,219 is also concerned with a joystick operated sensor where two normally spaced resistive areas can be brought into engagement with each other by means of bending a resiliently flexible substrate. All of the above prior proposals rely on a positive bending of a flexible element for their operation. Whilst such proposals may be suitable for light load applications, there are applications, e.g., in butt bolted joints, which may be subjected to very high loads typically of 5,000 kg or higher where measurement of loading is required and where bending movement of the kind required to operate the sensors of the foregoing patents is not available. The present invention is concerned with a device for sensing loads which will enable loading in applications such as rigid butt bolted joints to be sensed.

According to one aspect of the invention there is provided a device for sensing loads comprising a rigid first member a rigid second member, said first and second members having opposed surfaces and a sensor element between said opposed surfaces, said sensor comprising an electrically conductive layer of material in conductive engagement with conductor means to provide an electrical path between the conductor means and said conductive layer, the conductive engagement being arranged to vary with variation in loading between the sensor and one of said members.

Preferably, the conductive layer comprises a film of material having a conductive surface.

The conductive layer may define microscopic undulations having peaks which engage said conductor means and which deform resiliently during varying between the first and second members to vary surface contact area between the peaks and conductor thereby varying resistance of the electrical path to the flow of electrical current along said path.

The conductive layer may comprise a film of carrier material having a conductive surface applied thereto.

The conductive layer may have a thickness in a range of 0.005 mm. to 0.1 mm.

A plurality of sensors may be provided spaced apart between the first and second members for sensing axial and torsional loading of one of the first and second members relative to the other.

In one embodiment, the sensors are arranged in the same plane. In such a case, two sets of sensors may be provided in spaced apart planes with a rigid third member therebetween whereby the sensors are arranged between the first, second and third members.

In another embodiment, the sensors are arranged in respective mutually inclined planes. Two sets of sensors may be provided in such an embodiment one set being arranged in first said mutually inclined planes and the second set being arranged in second mutually inclined planes, transverse to the first said mutually inclined planes, a third rigid member being arranged between said sets whereby the sensors are arranged between the first, second and third members.

Preferably, load to be sensed by said sensor is applied to the third member. One or more arms may project from the third member to which load is applied.

Load may be applied to the first member by a resiliently compressed element. The element may comprise a length of elastomeric material. The resilient element may be located within guide means to restrict deformation of the element transverse to the direction of said load. The guide means may comprise a rigid sheet of material formed with an aperture in which the resilient element is located.

Preferably, the load applied to the sensor is a compressive load, the variation in loading either increasing or decreasing said applied compressive pre-load.

According to another aspect of the invention there is provide a sensor device for measurement of static forces, dynamic forces and torque in three axes X-Y-Z, comprising compression bars arranged to be compressed into working position within a protective mounting plate provided for parts of the sensor device, the compression bars being arranged within a form factor impeder which limits sideways swelling of the bars during compression whereby compressive loading is directed towards at least one base plate in the form of a chip or board provided with metallic sensing members and upon which base plate is arranged a rigid load equalization plate, and sensor media supported by the load equialization plate between the load equalization plate and base plate, the measurement then being arranged to be made between the sensing members and the sensor media.

The sensor or, where provided each set of sensors is arranged in circuit with an electrical bridge arrangement enabling variation in resistance due to variation of said conductive engagement, to be sensed electrically. The sensor can be calibrated by using such a bridge so as to provide an indication of applied loading.

An electrical bridge circuit may be used to receive electric current which passes through one or more sensors and to provide an output corresponding to a particular loading applied to the load sensing device.

Devices in accordance with the invention will now be described by way of example with reference to the accompanying drawings in which:

FIG. 1 is diagrammatic cross section through a device in accordance with the invention drawn to a large scale.

FIG. 2 is a cross-section of part of the device of FIG. 1 showing the aforesaid film of material having a conductive surface of undulating form.

FIG. 6 is a cross section through part of the sensing device of FIG. 5 shown partially assembled.

Figure 5:
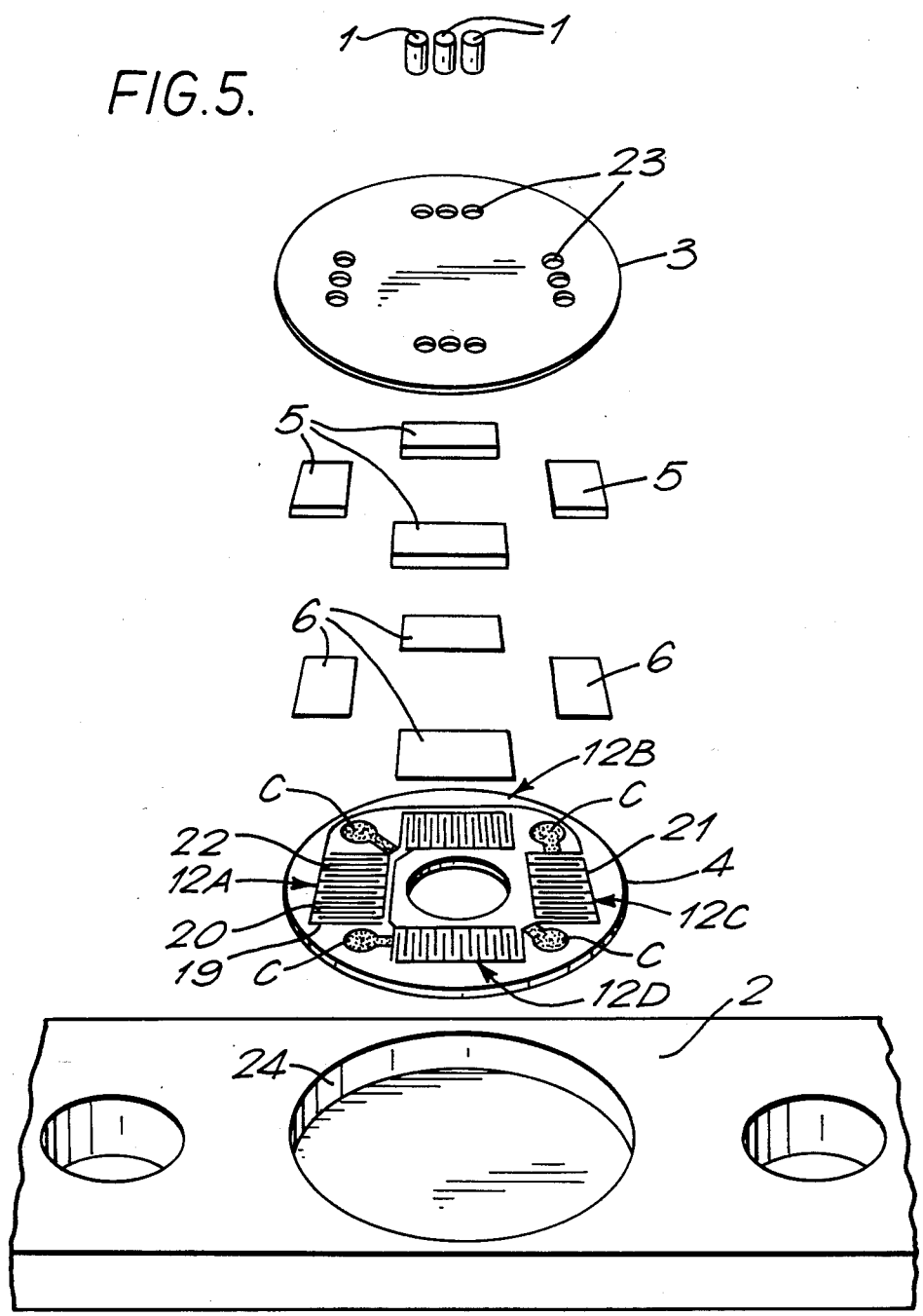
FIG. 5 is an exploded view of the part of one form of device in accordance with the invention showing plurality of sensors.
Figure 15:
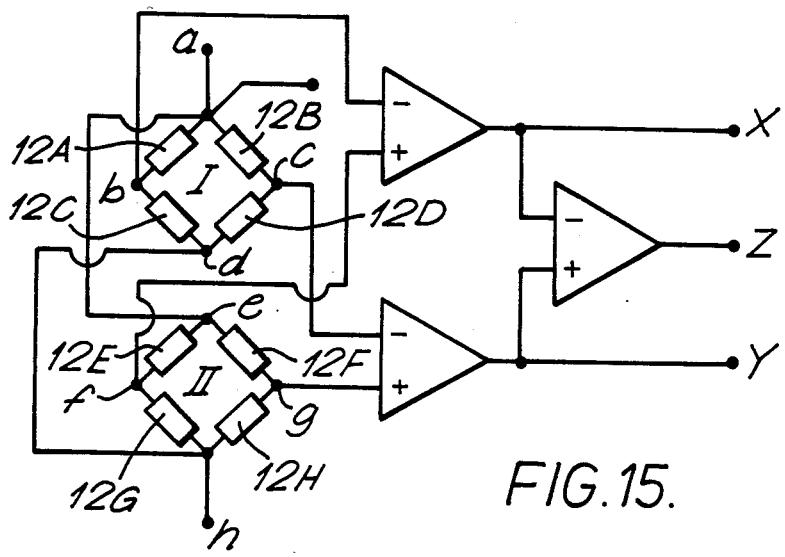
Figure 16:
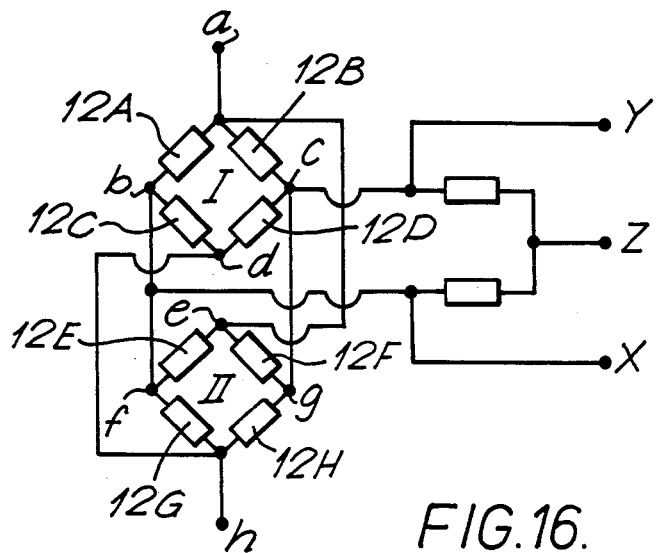
Figure 17A:
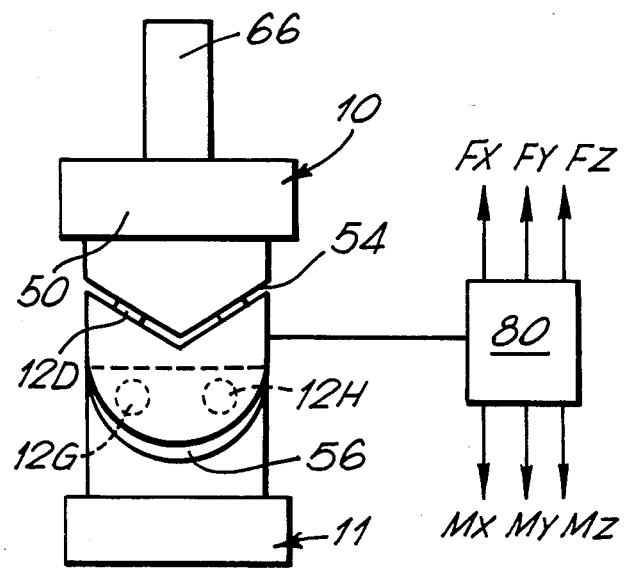
Figure 17:
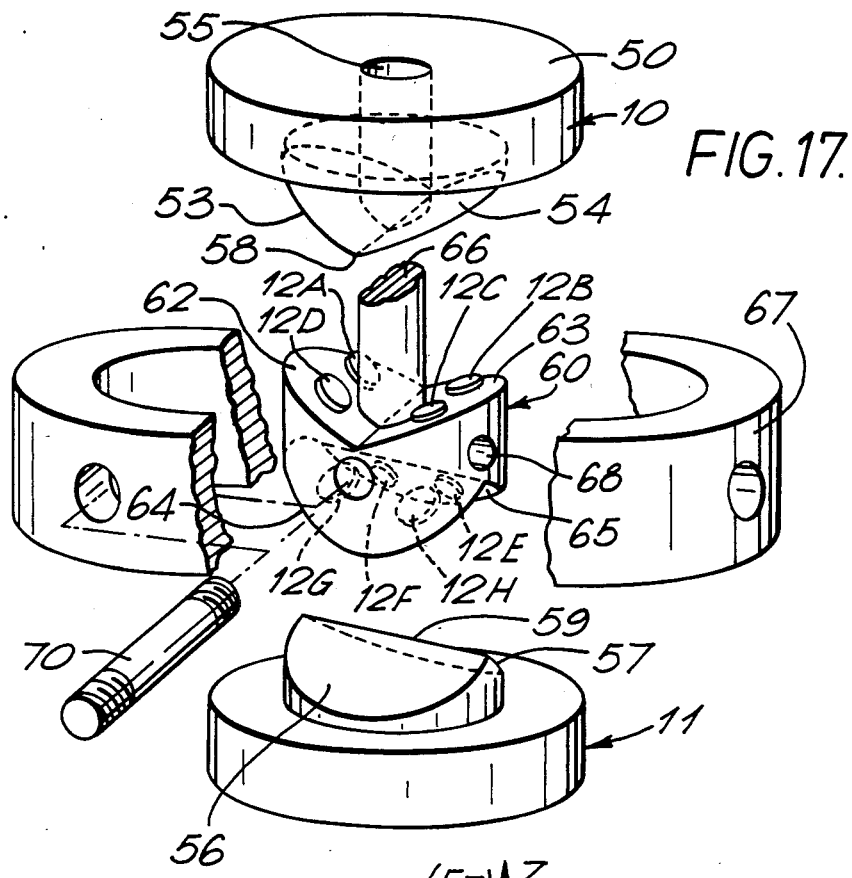
Figure 18:
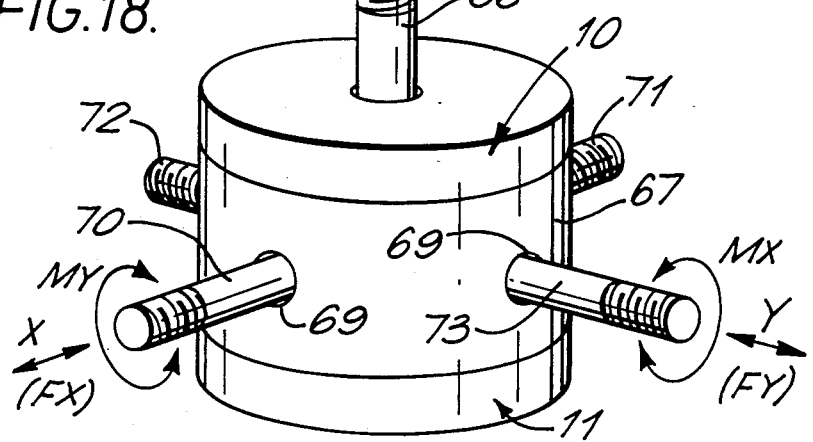

FIG. 7 is a perspective exploded view of a load-sensing towing device for, e.g. mobile vehicles and incorporating the sensing device of FIG. 5, FIG. 8 is a perspective view of an assembled towing device, FIG. 9 is a perspective exploded view of a second form of device in accordance with the invention, FIG. 10 is a cross section through the device of FIG. 9 in an assembled condition with wiring omitted, FIG. 11 is a perspective view of an assembled sensing device, FIG. 12 is a diagram showing the bridge-type connection of the sensors, FIG. 13 is a diagrammatic perspective view of sensor connections for the devices of FIGS. 9 to 11, FIGS. 14 to 16 illustrate different wiring arrangements for the bridges, FIG. 17 is a perspective exploded view of a third form of device in accordance with the invention, FIG. 17a is a side view of part of the device of FIG. 17 in an assembled condition, FIG. 18 is a perspective view of the device of FIG. 17 in an assembled condition, In FIG. 1 a rigid first member 10 and a rigid second member 11 are provided and a sensor 12 is located therebetween. The first and second members are normally urged together by means not shown so that the sensor 12 is subjected to compressive loading between a lower surface 13 of the first member 10 and an upper surface 14 of the second member 11.

Figure 2A:
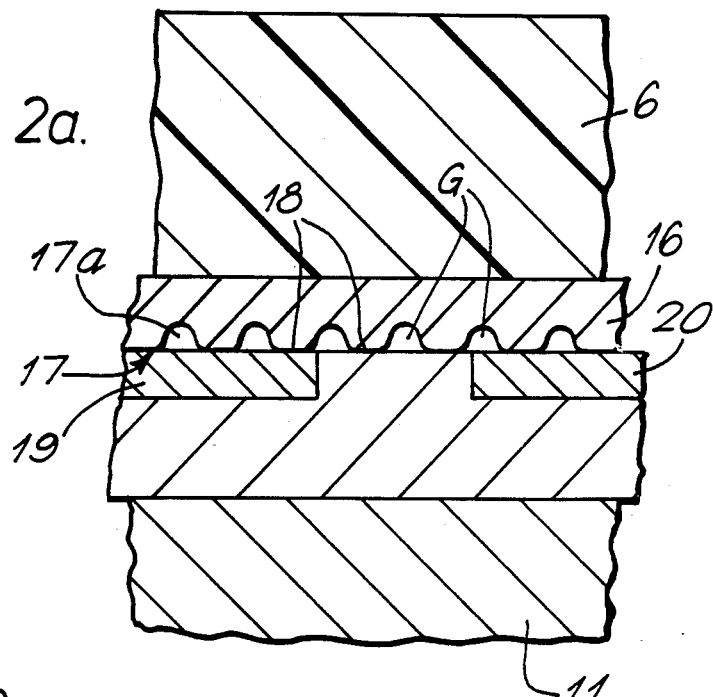
FIG. 2a is a cross section similar to FIG. 2 with the device under increased load.

The sensor 12 is illustrated in greater detail in FIGS. 2 and 2a and includes a film of plastics material 6 e.g. a polymer having an electrically conductive metal oxide coating 16 e.g. ferro oxide.

The total thickness T of the film and coating is in the range 0.005 mm to 0.1 mm. The coating has a lower surface 17 which has microscopic undulations 17a of a depth around 1 to 2 microns, peaks 18 of which engage conductive electrodes 19, 20 (see also FIGS. 2,3 and 4) on a base plate 4. The base plate 4 is formed from an insulative substratum such as a ceramic -material, laminate or the like with the electrodes embedded therein. The electrodes 19, 20 are spaced apart and are arranged in an electrical bridge circuit (described below). Electric current can flow between electrodes 19,20 via the contacting peaks 18 of the coating. If loading F is increased so as to compress the sensor 12 further, the peaks 18 flatten out further as in FIG. 2a thereby increasing the contact area i.e. the conductive engagement of the peaks 18 against the electrodes 19,20. The increased contact area or conductive engagement reduces the resistance to flow of electric current and the change in current flow is registered in the electrical bridge.

Figure 3:
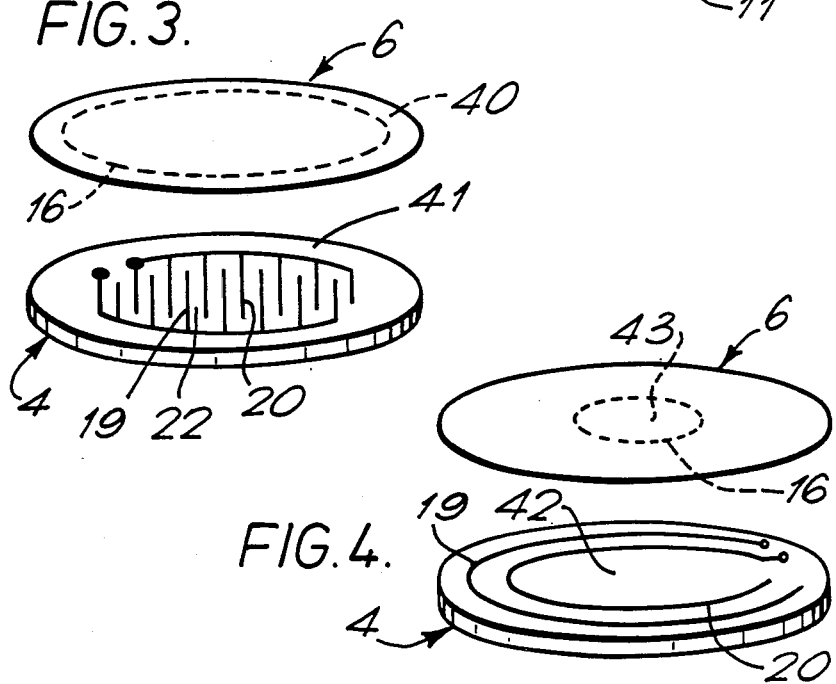
FIGS. 3 and 4 are perspective views of different sensor constructions.

The film 6 may comprise a small disc of material as shown in FIG. 3 having an outer peripheral margin 40 on its underside which may be void of oxide coating 16 and which can be glued to a margin 41 of a disc-like base plate 4. Alternatively, the disc shaped film 6 can be attached to the plate 4 by glue applied to the plate in a passage 22 between the electrodes 19,20. If desired, the electrodes can be arranged substantially concentrically around a central void area 42 as in FIG. 4. The underside of the disc-like film 6 can be formed with a central area 43 void of oxide coating 17 which can be glued to the area 42.

The principle of the sensor 12 can be likened into that of a passive bipolar transistor with a mechanical base, where the emitter and collector are electrodes 19,20 and the base is the mechanical force or loading F. The sensitivity of the sensor 12 is governed by the distance between the electrodes 19,20 and the length of a serpentine passage 22 between them determines the current flow. When the sensor is not under load (the basic loading of the sensor, i.e. the pre-load resulting from assembly, being regarded as a "no load" condition) the current flow is small and the sensor conducts to a lesser degree because the conductive particles in the surface of the medium forming the peaks 18 do not have a sufficiently large contact area (compared with heat emission from a transmitter loosely screwed against a cooling flange and firmly screwed against a cooling flange or different flange sizes), i.e. the impedance of the mechanical interengagement between the coating 16 and electrodes thus 19,20 determines the change in resistance. Since the electrodes 19,20 are located in one plane the flow of current merely goes on the surface in the coating media and not through a "true" resistance body, (compare mass resistance and metal film resistance) the difference being revealed, i.e. in noise factor. The noise should be low since measurements are desirable even at low levels. The true sensor consisting of an electrode surface and surface of coating 16 ar thus stratified. This means that the sensor 12 can be made very thin depending o the production technique thereby making it virtually impossible for skew forces to exist to the same extent as they would, say, in a strain gauge since strain gauges for example cannot function without some form of underlay, i.e., something which has a physical volume, and shearing forces can arise in the volume since this is a three-dimensional phenomenon. Consequently the sensor of the present invention can more easily be directed towards the force. The sensor works either initially clamped between the first and second members or free, depending on the type of application. The advantage of a sensor of this type is that it works with a very large swing, typically 0.5–0.9 v/v, and that the sensor works both statically and dynamically from DC to several hundred KC. If so required, the sensor can be made physically very small, e.g. 1 $mm^2$ or smaller, and so that the force can be applied directly on the sensor. This means that measurements can be made in infinitely small points, i.e. at discrete points, and that encapsulation and sensor accuracy is dependent upon hysteresis to a lesser degree. Clearly, that is unlike the strain gauge which is entirely dependent upon the hysteresis of the underlay since the strain gauge only measures the strain on the underlay. Mechanical punishability is another strength of the sensor. On account of its construction, it can be handle more carelessly than sensors which utilize piezo and quartz crystals which are brittle.

Referring now to FIGS. 5 and 6, four sensors are provided indicated generally at 12A, 12B, 12C and 12D comprising four sets of electrode pairs 19,20 on a single circular plate 4 and four associated coated films 6. Four load equalization plates 5 are provided and, in the assembled device, the films 6 are sandwiched between the plates 5 and the respective pairs of electrodes 19, 20 (see FIG. 6). Four sets of compression bars 1 are provided (one set only being shown) which locate within apertures 23 formed in a form factor inhibitor 3 constructed from, e.g. a rigid metal sheet or plate. The plates 3 and 4 are of equal diameter so as to fit within a blind bore 24 in a mounting plate 2 when the device is assembled and the sets of apertures 23 overlie the respective sensors. The purpose of the mounting plate is to act as a holder for parts 1, 3, 4, 5 and 6 and as a protector for the sensors. The films 6 can be glued in position over the electrodes by applying glue to the plate 4 e.g. in spaces 22 between the electrodes. Alternatively or additionally, the films 6 can be carried by the respective plates 5.

On assembly with the compression bars 1 in the apertures 23, as shown in FIG. 6, a towing device, e.g. a towball 25, is fixed to the mounting plate 2 as in FIG. 8 by bolts 26. The form factor inhibitor 3 is positioned midway down the compression bars 1. Bolting the tow ball 25 to the mounting plate 2 causes an attachment plate 28 of the tow ball to compress the compression bars as in FIG. 6 between the plate 28 and the plates 5. The form factor inhibitor causes waist 27 to be formed in the compression bars. By forming a waist 27 on the bars 1, a reduction is achieved in the form factor whereby the bars 1 are prevented from swelling out sideways over part of their length during the compression so as to aim the compressive force more accurately towards base plate 4.

The main mechanical function of the load equalization plates 5 is to transfer and disperse the load uniformly over the surface of coating 16. Also when each sensor is connected to a current source heat is generated in thin gaps G (FIGS. 2 and 2a) formed by the distances between the electrodes of the base plate 4 and the electrically conductive part of the polymer-borne metal film coating 16. The width of the gaps G decides the working range of the sensor. When internal differences in the transitions between the electrodes surfaces can give rise to partial overheating this must be evened out and disperse over the entire operative part of the surface of the sensor 12 so that thermic movements are avoided and the temperature can be kept within a range suitable for the sensor medium 16. This means that the thermic noise can be kept low since the noise factor dictates the dissolution and the total dynamics of the sensor. The material from which the plates 5 are formed is therefore of good thermal conducively and low hysteresis and also the plates 5 have an electrically screening function.

Once the towing device has been assembled as in FIG. 8 the bars 1 are compressed sufficiently to apply a pre-load to the plates 5 with the upper ends of the bars 1 at the same level as the upper surface 30 (as viewed in FIG. 6) of the mounting plate 2. In this position, a working load on the sensors has been reached. Also as shown in FIGS. 7 and 8 is a foundation or fixing plate 32 which is attached to a suitable load-bearing part of the vehicle. A cable trunk 31 carries wiring to contacts indicated generally at C (FIG. 5) for the sensors. If desired, a sensor 12 can be directly inserted between the attachment plate 28 and the mounting plate 2 of the towing device F. In this case, mounting plate 2 would be a conventional mounting normally included in the towing device of a vehicle and to which the attachment plate 28 is secured by means of two bolts 26 attached to the vehicle (not shown) for example to its frame member or chassis. The sensor 12 (not shown) on a plate 4 with holes for bolts 26 is then clamped by bolts between the fixing plate 32 and the attachment plate 28.

In use, loading in direction of axis 2 in FIG. 7 will cause very small (virtually microscopic) deformation of attachment plate 28 which deformation is transmitted through the compression bars 1 to the pre-loaded sensors 12. A typical deformation from a datum would be from 0.001 mm to 0.1 mm. A pure load in direction Z will cause all sensors to be compressed further or relieved and with the sensors in a bridge arrangement, e.g. as 12A, 12B, 12C and 12D in FIG. 14, the change of resistance of the sensors will affect the balance of the bridge and the bridge can be calibrated to provide an output reading which indicates the applied loading.

Pure sideways loads in directions X, Y will not affect the sensors as such loads will not compress or relieve the sensors However, torque applied as MY and MX will be registered by the bridge as an increase in resistance in one or more of the sensor 12A, 12B, 12C and 12D and a simultaneous decrease in resistance in one or more of the remaining sensors. The sensors device in a towing arrangement is useful in that loading on the tow ball resulting from, say, one trailer wheel developing a flat tire can be sensed and indicated to the driver of the vehicle.

Reference is now made to FIGS. 9 and 10 in which the first member 10 comprises a rigid circular block of metal, the second member comprises a further rigid block of metal formed with a blind bore 35, and two sets of sensors 12A, 12B, 12C, 12D and 12E, 12F, 12G, 12H are provided on plates 4 and 4a respectively one above and one below a third rigid metal member 36. The member 36 comprises a circular plate 37 which locates in the bore 35 and an arm 38 which extends upwardly from the plate 37. The sensors of each set are located at the same centre distances, i.e. radii, foom the axis A of plate 37 and are offset from each other by 90° in a circumferential sense. The sensors of one set lie directly above/below the sensors of the other set.

Figure 4:
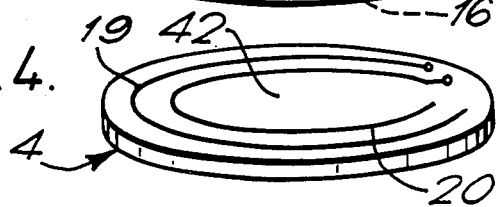

The sensors are constructed in a similar manner to the sensors described with respect to FIGS. 3, 4 or 5. The electrodes are wired into a bridge arrangement e.g. as shown in FIGS. 12 to 16. The bridge including sensors 12A–12D is indicated as I and the bridge including sensors 12E–12F is indicated at II.

In use, the device is assembled by bolting the first and second members 10, 11 via bolt holes 45 together so that the third member is clamped between them as shown in FIG. 10, the clamping force providing a pre-load on the sensors 12A–12H. Wires W are shown for connecting the sensors at contacts C to a bridge circuit, the wires passing through recesses 46 in the upper and lower members 10,11.

A point Xc (FIG. 10 and in FIG. 11 but unshown) on the axis A of third member 37 axially midway between the plates 4 comprises a torsion and power centre for the sensors or base plates. When the arm 38 of the sensor is exposed to a force which enters at a right angle from the side to the torque arm to apply a torque, e.g. MX or MY resistance differences arise in the sensors. However, pure force coming from the side perpendicular to the arm in the plane Xc, e.g. in an X or Y direction, will not vary the loading on the sensors. When the torque arm 38 of the sensor is exposed to force Fz along axis Z, loading on all the sensors is varied. For example, load applied to the arm 38 along axis Z in the upward direction (as viewed) in FIGS. 9 will increase loading on sensors 12A–12D and decrease loading in sensors 12E–12H.

FIG. 11 shows in diagrammatic form an assembled device of the FIG. 9 type. In this case the member 37 is in the form of a ring between the first and second members 10,11. The axis A of the arm 38 (not shown) is indicated along with load F in direction Z and torque Mx. The angular positioning of the sensors 12A-12D between members 10,37 is shown diagrammatically but the positioning of sensors 12E-12H is not shown.

Torque MX will be sensed by sensors 12A, 12C and 12E, 12G and torque MY will be sensed by sensors 12B, 12D and 12F, 12H.

Various bridging arrangements for the sensors of FIGS. 9 to 11 will now be described with reference to FIGS. 12 to 16. In the drawings, terminals of the bridge I are indicated at a, b, c and d for the sensors 12A-12D and at e, f, g, and h in bridge 11 for sensors 12E-12F. FIG. 13 is a diagrammatic perspective view showing the connections of the sensors in the devices of FIGS. 9 to 11.

Figure 14:
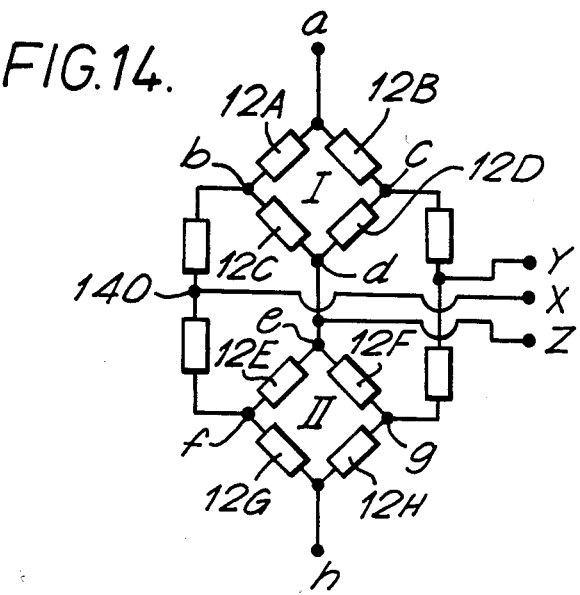

FIG. 14 shows the bridges I and II of FIG. 13 connected in series to a dual power supply. Terminals are positive and terminals d and h are negative. For output Z when loading the sensors in direction Z, the output is taken from a connection point 140, i.e., the connection point for terminals d and e. Output MX resulting from torque MX is the algebraic sum of outputs at terminals b and f, and output MY resulting from torque MY is the algebraic sum of outputs at terminals c and g.

FIG. 15 shows bridge I and 11 supplied in parallel. The output Z is the sum of output signals at b,f and c.g.

FIG. 16 shows the bridges I and III with a parallel power supply at a and h. Terminals b and f are connected together and terminals c and g are connected together to provide outputs MX and MY respectively. Output Z is the sum of the outputs from terminals b, f, c and d.

Reference is now made to FIGS. 17, 17a and 18 which illustrate a device to enable pure loads in the X, Y and Z axes to be sensed and torque MZ about axis Z as well as torques MX and MY. The device, therefore, will sense universally applied loads.

The first member 10 comprises a circular block of metal 50 having two inclined lower surfaces 53,54 and formed with an axial bore 55. The second member 11 is also a circular block of metal having two inclined upper surfaces 56, 57. The inclined surfaces of each member 110,11 meet at respective ridges 58, 59 which are at right angle to each other. A third member 60 is likewise formed from a block of metal and has upper inclined surfaces 62, 63 and lower inclined surfaces 64,65. The upper inclined surfaces 62,63 are complementary to surfaces 53,54 and the lower inclined surfaces are complementary to surfaces 56,57.

Surface 62 of the third member carries sensors 12A and 12D surface 63 carries sensors 12B and 12C, surface 64 carries sensors 12G and 12H and surface 65 carries sensors 12E and 12F. The sensors may be of similar construction to those described with reference to FIGS. 3 to 5. The sensors 12A to 12D are arranged as in FIG. 13 and are bent upwardly about an imaginary line between a and d and the sensors 12E to 12F are bent downwardly about an imaginary line between e and f. The imaginary lines form the lines of intersection of the inclined surfaces 62,63 and 64,65.

The device is assembled by moving the first, second and third member together as in FIG. 17a so that sensors 12A and 12D engage surface 53, sensors 12B and 12C engage surface 54, sensors 12G and 12H engage surface 56 and sensors 12E and 12F engage surface 57. The third member 60 has an upwardly extending arm 66 which passes with clearance through bore 55. A ring like housing 67 surround the third member and the first and second members 10,11 can be bolted thereto, the bolts creating a clamping force which places the sensors under compression The third member is formed with four radial bores 68 (one only being shown) into which can be screwed four respective arms 70,71, 72 and 73 which pass with clearance through apertures 69 in the housing 67.

The sensors are connected in a suitable bridge arrangement indicated generally at 80 in FIG. 17a and forces applied to the device of FIG. 17 and 18 are applied through one or more of the arms 66 and 70-73 with the housing 67 held against movement. Upward force Fz (as viewed in FIG. 18) on axis Z will increase load on sensors 12A-12D and decrease load on sensors 12E-12F. Sensors 12A-12D therefore, sense increasing load and sensors 12E-12F sense decreasing load. The opposite applies during downward force Fz on axis Z.

Force Fx generally to the right (as viewed in FIG. 18) on axis X (parallel with ridge 58) will have no effect on the sensors 12A-12D but will increase load on sensors 12G and 12H and decrease load on sensors 12E and 12F. The opposite applies during load Fx on axis X generally to the left (as viewed in FIG. 18).

Force FY generally to the right (as viewed in FIG. 18) on axis Y (parallel with ridge 59) will have no effect on sensors 12E-12H but will increase load on sensors 12A and 12D and decrease load on sensors 12B and 12C. The opposite applies during load FY on axis Y generally to the left (as viewed in FIG. 18).

Torque MZ creates a change in loading on all sensors. E.g. clockwise torque MZ when viewed from above in FIG. 18 will increase loading on sensors 12A, 12C, 12F and 12H and decrease loading on the remainder.

Torque MX also creates a change in loading on all sensors. E.g. anticlockwise MX as viewed in FIG. 18 will increase loading on sensors 12B, 12D, 12H, 12F and decrease loading on the remainder.

Torque MY likewise creates a change in loading on all sensors. E.g. clockwise MY as viewed in FIG. 18 will increase loading on 12A, 12D, 12E, 12H and decrease loading on the remainder.

The table set out below indicates the state of the sensors 12A-12H during loading of the device in FIGS. 17 and 18:

| LOAD | SENSOR | | | | | | | |
|------|---|---|---|---|---|---|---|---|
|      | A | B | C | D | E | F | G | H |
| FX   | X | X | X | X | 0 | 0 | 1 | 1 |
| FY   | 0 | 1 | 1 | 0 | X | X | X | X |
| FZ   | 1 | 1 | 1 | 1 | 0 | 0 | 0 | 0 |
| MX   | 1 | 1 | 0 | 0 | 0 | 0 | 1 | 1 |
| MY   | 1 | 0 | 0 | 1 | 1 | 0 | 0 | 1 |
| MZ   | 0 | 1 | 0 | 1 | 0 | 1 | 0 | 1 |

1 = Increasing Load
0 = Decreasing Load
X = Not affected

The outputs for FX, FY, FZ, MX, MY and MZ are provided by the bridge arrangement 80 as shown in FIG. 17a.

Wires can be connected to the sensors and extend from the housing in a similar manner to that shown in FIG. 9.

The sensing devices described constitute force transducers which are particularly robust and which can be subject to considerable initial pre-load. Also, it is found that the sensors will remain operational even when the rigid members between which they are located are loaded up to the point where the members yield and begin to take on permanent deformation, known in the art as the float limit or deformation limit of the members. The bridge arrangement used then has its outputs set to zero to provide a datum whereby changes in loading applied to the sensing device will provide readings working from that datum.

I claim:

1. A device for sensing loads comprising a rigid first member, a rigid second member, said first and second members having opposed surfaces, and a plurality of sensors spaced apart in the same plane between said opposed surfaces, each said sensor comprising an electrically conductive film of material having a conductive surface, the film being in permanent conductive engagement with conductor means to provide an electrical path between the conductor means and said conductive film, the film being under an initial pre-load between the first and second members and the conductive engagement being arranged to vary with variations in axial and torsional loading between the sensor and one of said members.

2. A device according to claim 1 in which the conductive film defines microscopic undulations having peaks which conductively engage said conductor means and which deform resiliently as loading wires to vary surface contact area between the peaks and conductor means thereby varying resistance of the electrical path to the flow of electrical current along said path.

3. A device according to claim 1 in which the conductive film has a thickness in a range of between 0.005 mm and 0.1 mm.

4. A device for sensing loads comprising a rigid first member, a rigid second member, a rigid third member arranged between the first and second members, said first and second members having surfaces opposed to surfaces of the third member, two sets of sensors arranged in spaced apart planes so that one set lies between the opposed surfaces of the first and third members and the other set lies between the opposed surfaces of the second and third members, each set comprising a plurality of sensors spaced apart between the first, second and third members and each sensor comprising an electrically conductive layer of material in conductive engagement with conductor means to provide an electrical path between the conductor means and said conductive layer, the conductive engagement being arranged to vary the variations in loading between the sensor and one of said members, said sensors being arranged to sense axial and torsional loading of one of the first and second members relative to the other.

5. A device according to claim 4 in which a load to be sensed is applied, in use, to said third member.

6. A device according to claim 4 in which the sensors are arranged in respective mutually inclined planes.

7. A device according to claim 6 in which said one set of sensors is arranged in first said mutually inclined planes and the second set is arranged in second mutually inclined planes transverse to the first said mutually inclined planes.

8. A sensor device for measurement of static forces, dynamic forces and torque in three axes X-Y-Z, comprising compression bars arranged to be compressed into working positions within a protective mounting plate provided for part of the sensor device, the compression bars being arranged within a form factor inhibitor which limits sideways swelling of the bars during compression whereby compressive loading is directed towards at least one base plate in the form of a chip or board provided with metallic sensing members and upon which base plate is arranged a rigid load equalization plate, and sensor media supported by the load equalization plate between the load equalization plate and base plate, the measurement then being arranged to be made between the sensing members and the sensor media.

9. A device as claimed in claim 8 in which the base plate is made of an insulated substratum.

10. A device as claimed in claim 8 in which two base plates are provided and a member to which load is applied in, use, is located between the two base plates.

11. A device as claimed in claim 8 in which the load equalization plates are made of material with good thermal conductivity and low hysteresis.

12. A device as claimed in claim 8 in which the sensor media is provided with a conductive coating.

13. A device for sensing loads comprising a rigid first member, a rigid second member, said first and second members having opposed surfaces, and a sensor between said opposed surfaces, said sensor comprising an electrically conductive layer of material in conductive engagement with conductor means to provide an electrical path between the conductor means and said conductive layer, the conductive engagement being arranged to vary the variations in loading between the sensor and the first said members, said loading being applied to said first member by a resiliently deformation of the element transverse to the direction of load.

* * * * *